(12) United States Patent
Wolff

(10) Patent No.: US 7,809,685 B2
(45) Date of Patent: Oct. 5, 2010

(54) SECURE AND EFFICIENT METHODS FOR LOGGING AND SYNCHRONIZING DATA EXCHANGES

(75) Inventor: Gregory J. Wolff, Palo Alto, CA (US)

(73) Assignee: Ricoh Co., Ltd., Tokyo (JP)

(*) Notice: Subject to any disclaimer, the term of this patent is extended or adjusted under 35 U.S.C. 154(b) by 187 days.

(21) Appl. No.: 11/673,496

(22) Filed: Feb. 9, 2007

(65) Prior Publication Data

US 2007/0255530 A1 Nov. 1, 2007

Related U.S. Application Data

(60) Provisional application No. 60/793,967, filed on Apr. 21, 2006.

(51) Int. Cl.
*G06F 17/00* (2006.01)

(52) U.S. Cl. .................. 707/648; 707/617; 707/623; 707/625; 707/646; 707/649; 707/690; 702/187; 709/204; 709/223; 709/227; 709/245; 709/248; 714/20; 714/723; 726/1; 726/26

(58) Field of Classification Search .................. None
See application file for complete search history.

(56) References Cited

U.S. PATENT DOCUMENTS

| | | | | |
|---|---|---|---|---|
| 5,592,618 | A | * | 1/1997 | Micka et al. ............... 714/54 |
| 5,708,780 | A | * | 1/1998 | Levergood et al. .......... 709/229 |
| 5,778,388 | A | * | 7/1998 | Kawamura et al. .............. 1/1 |
| 5,845,292 | A | * | 12/1998 | Bohannon et al. .............. 1/1 |
| 5,949,876 | A | | 9/1999 | Ginter et al. |
| 6,065,018 | A | * | 5/2000 | Beier et al. .................. 1/1 |
| 6,192,365 | B1 | * | 2/2001 | Draper et al. ................. 1/1 |
| 6,289,356 | B1 | * | 9/2001 | Hitz et al. .................... 1/1 |
| 6,308,175 | B1 | | 10/2001 | Lang et al. |

(Continued)

FOREIGN PATENT DOCUMENTS

EP 1622074 2/2006

(Continued)

OTHER PUBLICATIONS

Hisashi, Toyoshima, et al, "Hysteresis Signature and Its Related Technologies to Maintain the Digital Evidence for Network Activities in Future Society," Journal of the National Institute of Information and Communications Technology, vol. 52, Nos. 1/2, 2005, pp. 191-201.

(Continued)

*Primary Examiner*—Apu M Mofiz
*Assistant Examiner*—Hung D Le
(74) *Attorney, Agent, or Firm*—Blakely, Sokoloff, Taylor & Zafman LLP

(57) ABSTRACT

A method and apparatus is disclosed herein for logging and/or synchronizing data exchanges. In one embodiment, the method comprises receiving a request from a requester to post data to a first log, identifying the log based on a context identifier in the request indicative of a location of the first log and digital data associated with a document corresponding to the first log, creating a first entry based on data in the request, appending the first log with the first entry, calculating a first identifier based on log entries in the first log, and sending the first identifier to the requester.

24 Claims, 9 Drawing Sheets

U.S. PATENT DOCUMENTS

| | | | |
|---|---|---|---|
| 6,345,288 B1 * | 2/2002 | Reed et al. | 709/201 |
| 6,360,215 B1 | 3/2002 | Judd et al. | |
| 6,363,363 B1 * | 3/2002 | Haller et al. | 705/40 |
| 6,546,385 B1 | 4/2003 | Mao et al. | |
| 6,574,627 B1 * | 6/2003 | Bergadano et al. | 1/1 |
| 6,584,477 B1 * | 6/2003 | Mosher, Jr. | 1/1 |
| 6,615,208 B1 | 9/2003 | Behrens et al. | |
| 6,687,696 B2 | 2/2004 | Hofmann et al. | |
| 6,754,773 B2 | 6/2004 | Ulrich et al. | |
| 7,054,626 B2 * | 5/2006 | Rossmann | 455/422.1 |
| 7,203,796 B1 * | 4/2007 | Muppalaneni et al. | 711/114 |
| 7,278,115 B1 | 10/2007 | Conway et al. | |
| 7,406,487 B1 | 7/2008 | Gupta et al. | |
| 2002/0023221 A1 * | 2/2002 | Miyazaki et al. | 713/178 |
| 2002/0046072 A1 | 4/2002 | Arai et al. | |
| 2002/0055942 A1 | 5/2002 | Reynolds | |
| 2002/0095454 A1 * | 7/2002 | Reed et al. | 709/201 |
| 2002/0120484 A1 | 8/2002 | Bantz et al. | |
| 2003/0046586 A1 | 3/2003 | Bheemarasetti et al. | |
| 2003/0050863 A1 | 3/2003 | Radwin | |
| 2003/0053655 A1 * | 3/2003 | Barone et al. | 382/100 |
| 2003/0088593 A1 | 5/2003 | Stickler | |
| 2003/0126148 A1 | 7/2003 | Gropper et al. | |
| 2003/0126276 A1 * | 7/2003 | Kime et al. | 709/231 |
| 2004/0030681 A1 | 2/2004 | Shannon et al. | |
| 2004/0064833 A1 | 4/2004 | Lee et al. | |
| 2004/0260593 A1 | 12/2004 | Abraham-Fuchs et al. | |
| 2005/0038809 A1 | 2/2005 | Abajian et al. | |
| 2005/0055343 A1 | 3/2005 | Krishnamurthy | |
| 2005/0071209 A1 | 3/2005 | Tatavu et al. | |
| 2005/0091229 A1 * | 4/2005 | Bali et al. | 707/100 |
| 2005/0262243 A1 | 11/2005 | Ternasky et al. | |
| 2005/0289187 A1 | 12/2005 | Wong et al. | |
| 2006/0149558 A1 | 7/2006 | Kahn et al. | |
| 2006/0150079 A1 | 7/2006 | Albornoz et al. | |
| 2006/0218204 A1 * | 9/2006 | Ofer et al. | 707/201 |
| 2007/0143356 A1 | 6/2007 | Kleinsmith et al. | |
| 2007/0156777 A1 * | 7/2007 | Wolff et al. | 707/201 |
| 2008/0071646 A1 * | 3/2008 | Hodson et al. | 705/27 |
| 2008/0104407 A1 * | 5/2008 | Horne et al. | 713/178 |

FOREIGN PATENT DOCUMENTS

| | | |
|---|---|---|
| EP | 1622074 A1 | 2/2006 |
| GB | 2401221 A | 11/2004 |
| WO | WO 03/071392 | 8/2003 |
| WO | WO 03/071394 | 8/2003 |

OTHER PUBLICATIONS

"ATTRIB," PC Computer Notes & Online Tutorials, http://web.archive.org/web/2002120474423/http://www.pccomputernotes.com/operating_systems/dos04.htm, Dec. 4, 2002, 5 pages.

"EP1804180 International Search Report," EP Appl No. 06027063.4—1527, Apr. 18, 2007, 6 pages.

Blanton, "Microsoft Computer Dictionary," Microsoft Press, Fifth Edition, Jan. 22, 2002, p. 578.

Flickr, "Photo tags," http://web.archive.org/web/20040607054247/http://www.flickr.com/photos/tags/, Jun. 7, 2004, 1 page.

Partial European Search Report for corresponding European Patent Application No. 07251693.3, Jun. 10, 2010, 6 pgs.

* cited by examiner

SECURE AND EFFICIENT METHODS FOR LOGGING AND SYNCHRONIZING DATA EXCHANGES

PRIORITY

The present patent application claims priority to and incorporates by reference the corresponding provisional patent application Ser. No. 60/793,967, titled, "Secure and Efficient Methods for Logging and Synchronizing Data Exchanges" filed on Apr. 21, 2006.

FIELD OF THE INVENTION

The present invention relates to the field of document processing; more particularly, the present invention relates to logging and synchronizing data exchanges.

BACKGROUND OF THE INVENTION

A reliable, shared history forms the basis for trust within communities. Standard processes such as double entry accounting and paper trails provide traceability and support for auditing. Independent verification of these records is critical to the functioning of all communities and institutions, from local clinics and self-help groups to global stock exchanges.

SUMMARY OF THE INVENTION

A method and apparatus is disclosed herein for logging and/or synchronizing data exchanges. In one embodiment, the method comprises receiving a request from a requester to post data to a first log, identifying the log based on a context identifier in the request indicative of a location of the first log and digital data associated with a document corresponding to the first log, creating a first entry based on data in the request, appending the first log with the first entry, calculating a first identifier based on log entries in the first log, and sending the first identifier to the requester.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
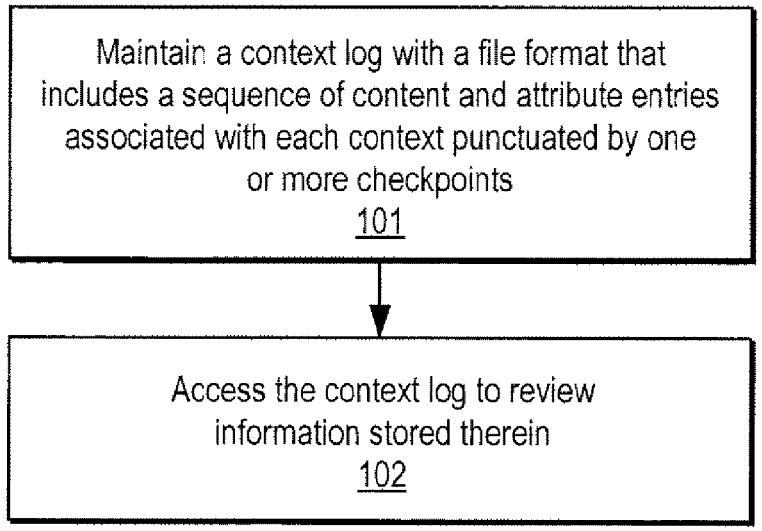
FIG. 1 is a flow diagram of one embodiment of a process for using logging content entries.

A method and apparatus for tracking digital data for making such digital exchanges are described. A set of conventions, protocols, and processes that brings a standard of traceability and transparency to digital exchanges supports these techniques. Such techniques may be used by developers when creating software and systems to interoperate according to these principles.

Elements of one embodiment of the system include globally unique identifiers, HTTP based data exchange, logging formats, synchronization methods, auditing procedures and authentication procedures. Each of these elements is described in detail below and illustrated with example implementations from the above projects.

In the following description, numerous details are set forth to provide a more thorough explanation of the present invention. It will be apparent, however, to one skilled in the art, that the present invention may be practiced without these specific details. In other instances, well-known structures and devices are shown in block diagram form rather than in details in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"): magnetic disk storage media; optical storage media; flash memory devices; electrical, optical, acoustical or other form of propagated signals (e.g., carrier waves, infrared signals, digital signals, etc.); etc.

Overview

Contexts

Before describing the techniques in detail, the concept of "contexts" as used herein and how they support traceability is described. For purposes herein, in one embodiment, a context is a combination of two unique identifiers. The first identifies a particular machine (e.g., a server). The second identifies a particular piece of digital data (e.g., a document file). These two identifiers are combined together to create yet another globally unique "context identifier."

A "context log" is a sequence of entries associated with this context. As described below, this sequence acts has a history for that context. In particular, the context log might represent the sequence of steps applied to a digital file, version history of a document, access of a document, or any other type of information that might be relevant for various applications. In other words, it represents a history for a piece of digital data. In one embodiment, the context log is stored and exchanged in a way that is transparent, auditable, and difficult or impossible to forge. As such, the context log provides properties similar to paper documents and serves a basis for the traceability of digital data.

Identifiers

There a number of identifiers used in conjunction with the techniques described herein. The following is a list of characters used to represent identifiers, or portions thereof:

A—Let A represents some digital data. In one embodiment, A is a digital file, but it can be any digital data or sequence of bytes.

0xA—Let 0xA=SHA1(A), that is the HASH (e.g., SHA1 function) applied to the string of bytes A. Any hash function may be used. In one embodiment, this is a 40 digit hexadecimal number.

0n—Represent a decimal number padded with leading zero's to be a constant length (e.g., 20 digits).

Content Entry

Any digital data can be represented as a sequence of n bytes. In one embodiment, 0xA:n is used as the identifier for a particular piece of data and represents a sequence of n bytes with HASH value 0xA. This identifier has several advantages. First, the identifier can be computed directly from the data itself and is essentially guaranteed to be globally unique. This also means the identifier is self-validating, which means that given the digital data, the identifier can be computed and verified. However, note that the reverse is not true; given the identifier, it is in general not possible to recover the original data. Because the data associated with an identifier is immutable (never changing), using this identifier makes caching or synchronization between machines very simple and efficient. If the identifier is in the local list of files then there is no need to request the file from a remote server.

Note that in some applications the length of the data (: n) may be omitted. This is especially the case for situations where the underlying data itself should remain private while the identifier is to be public. (Knowing n reduces the search space.) Implementations of exchanges should be coded such that the system functions whether or not: n is specified.

Attribute Entry

Within a particular context, a piece of data might have attributes associated with it. For example, a photograph might have a title. These attributes are represented as a sequence of name value pairs, attr1=val1 attr2=val2 . . . .

In one embodiment, 0x.M.0xA: m is used to denote a sequence of attributes associated with data 0xA in context 0xM. M is an identifier associated with a log file, usually a canonical URL for the log file including the machine name or ID. As before, 0xA is the identifier of ContentEntry A.

Unlike content entries, attributes associated with content in a particular context can change over time. In one embodiment, the attribute entry ID refers to the "most current" attributes for a particular piece of content within the context. In another embodiment, the attribute entry ID is used to refer to an entire history of the attributes in that context.

In one embodiment, attribute identifier is used as the ID attribute of the DIV XML element in a TiddlyWiki file. In that case, M is usually the URL where the log associated with the TiddlyWiki file was retrieved and A is the content of the DIV (that is the text of the individual tiddler).

In one embodiment, to identify a particular set of attributes in the history of a context, 0xM#nnn.0xA: m could be used.

Also note m may be omitted. This is simply a hint providing the total length of the set of attributes. For clarity of notation, the:m and:n length components of the content and attribute entries are generally omitted from the examples given.

Checkpoint

A context is a sequence of content entries and attribute entries. The sequence often contains a number of checkpoints. In one embodiment, a checkpoint is represented as 0xCC#0n, where 0xCC=SHA1(0xC#0n-1, ABC), i.e. the hash of the previous checkpoint, 0xC#n-1, concatenated with all entries, e.g. A B C, between the previous checkpoint and the new checkpoint being calculated. On is the index of this checkpoint. It is monotonically increasing for all checkpoints in the sequence.

These checkpoints are used primarily in the log files for synchronization and auditing processes described below.

HTTP API

In one embodiment, the core building blocks for digital exchange are four methods. They provide the mechanisms for uploading a content entry, downloading a content entry, uploading content attributes, and downloading content attributes. In the following, these processes are described as an interaction between a web client and web server. Note that many other implementations are possible depending on the context for the exchange. In particular, the Shared Records API describes a JAVA based programmatic interface for these methods.

Post Content

Clients use the HTTP POST method to send a digital data file to the server using multipart/form-data encoding as specified in RFC 1867. After decoding the data according to the "content-transfer-encoding" header, the SHA1 hash of the data is calculated. As described above, this identifier is used in referencing this content. The server returns the identifier to the client, usually as part of the URL that can be used to retrieve the data file. (See GET CONTENT section below.)

In one embodiment, the data will be stored in a file within a local storage directory. The content fingerprint 0xA, referred to herein as GUID as well, will be used as the filename. Additionally, the GUID may be stored in a database on the server.

At this point, in one embodiment, the server registers the GUID in the server's master log and (assuming this GUID) is new to this server) create a new log for this GUID. (See LOGGING section below.)

The particular action and field name(s) may be customized for particular applications. For example, one implementation uses "upload" as the action (e.g., http://server.org/upload) and "data" as the field name for the contents of the file.

In another embodiment, a filename is supplied as an attribute in the header of the MIME part containing the file data. This (and other attributes) may be associated with the content entry as attribute entries. In one implementation, the file extension from this filename is used as an extension on the locally saved copy of the file.

Get Content

In one embodiment, a client requests the data associated with a GUID from a sing an HTTP GET method. The URL for this request is usually:

http://server.org/0xA/0xA where first occurrence of 0xA is the GUID for the content (to identify its location) and the second occurrence of 0xA refers to the actual data. (Optionally, a .ext extension may be added to this GUID.) The server responds with the corresponding data. In one embodiment, the header of this response includes one or more various attributes associated with the content, including the mine type.

The client can verify the data by calculating the SHA1 hash of the downloaded data and comparing it with the identifier 0xA.

The path component for this download may be customized for local applications. For example, the path component may be as follows:

http://server.org/download/0xA.

However, in order to facilitate existing caching mechanisms, in one embodiment, the GUID is specified as part of the path, preferably the final "filename" part of the path— rather than the query component of the URL. Using the GUID in the query string, such as http://server.org/get?uid=0xA, is used below for accessing the attributes associated with the context of 0xA. Since 0xA is globally unique, the path components are not necessary for locating the data. In one embodiment, client and intermediate servers intercepts requests and reply with the corresponding data out of their caches when it is available. Also, in one embodiment, references to content files within HTML documents take the form of "href=0xA" to avoid existing problems of translating between local and global references.

Post Attributes

In one embodiment, a client uses an HTTP POST method to send attributes to a server, and request includes two parameters, UID and DIVS and is sent using the application/x-www-form-urlencoded encoding.

As an example, below is the URL that might be used to upload a comment titled "A Comment" to be associated with the file 0xA on server.org.

http://server.org/0xA&DIVS=<div title="A Comment">body of comment</div>

This example is shown using the URL for an HTTP request using the HTTP GET method rather than a POST method. In the GET method, the DIVS parameter is included as a query string on the URL. In a POST method, these parameters would be included in the body of the request message sent to the server. In practice, most Web applications will treat these two request methods identically and clients generally can use either approach for small quantities of data which do not exceed the limits on the length of URL's. In general it is safer to use the POST method.

Note that this example comes from the usage model for uploading "tiddlers" in TiddlyWiki. In the SharedRecords API, a slightly different format is used for posting metadata associated with a record but the basic concept is the same.

In this cases XML is used as the field value for the DIV's element. This XML, consisting of individual DIV elements, allows for simultaneously specifying both an attribute entry and a content entry. The content entry is the body of the DIV element. The name=value pairs in the attributes of the DIV elements are the attributes associated with that content entry within the context defined by UID. Note one might be tempted to use the name=value pairs of the HTTP request itself to specify the attribute entries. This is possible but causes two problems. First it means that there may be potential name conflicts if the web application handling the upload is using particular field names, such as UID, for its own purposes. Second, most Web applications are written to validate appropriate input including field names for POST requests. There's no way to do this kind of validation on accurate entries without unnecessarily restricting the range of potential field names and values. Encoding the attribute entries themselves as XML and sending them as the value of a specified field avoids these problems. Incidentally, it also makes processing on the client much easier since they can just send the unparsed DIVS that are stored in the local storage area.

Upon receiving this request, the server calculates the GUID of the content entry, 0xD, and then calculates the GUID of the associated attributes entry, e.g., 0xM.0xD. The content entry and attribute entry are then stored in the logs associated with context 0xM.

In one embodiment, the server performs a number of additional checks before deciding whether or not to accept these attribute entries and making them available via the GET ATTRIBUTES method. Unlike content entries which are globally unique and immutable, attribute entries are specific to a server context.

Upon success, the server returns the latest checkpoint on the server associated with the specified context. Various implementations can differ in what they return upon success. By returning the most recent checkpoint, it allows the client to verify whether or not their local sequence of attributes is consistent with the servers version. Note that the client can also always query the server for a set of attributes since a particular checkpoint. This is described in more detail below.

Post Attributes Context

As described above, a context identifier 0xM is generally the product or two unique identifiers. In one embodiment, the hash of the canonical URL is used for retrieving a context as the identifier for that context. For the example given above, M would be equal to the hash of the following URL:

http://server.org/get?UID=0xA which serves as the URL for getting the attribute sequence associated with 0xA on server.org, are described in more detail below.

Programmers might think of M as a namespace where 0xA is used to select which namespace to use on a particular server. The same server might have many different "namespaces" and that the same "namespace" might exist on many different servers. (Throughout the rest of this description, the term "digital data" or "document" is used instead of "namespace" for 0xA, although there is no requirement that 0xA correspond to the hash of any known data. For purposes herein, this identifier can be an arbitrary string that conforms to the correct syntactic conventions.)

The use of hash of a URL as the context identifier provides another piece of information that the client may have used to verify the authenticity of a sequence of attributes. In particular, when retrieving a set of attributes as described below, in one embodiment, the client calculates the identifier based on the request URL and verifies that against the attribute entry identifiers returned in response to the request.

A server may accept entries from a different context. For example, a client may upload a DIV which already has an ID attribute specifying a different context. Different servers may choose how to handle this differently. Some may include that attribute with the "foreign" context identifier within the set of attributes returned in response to GET requests. Servers may also choose to accept such entries as their own and assign a new identifier from their context. This will be described in conjunction with synchronization below.

Get Attributes

In one embodiment, to retrieve a set of attributes, a client uses HTTP GET with a URL of the form:

http://server.org/get?UID=0xA

This returns an HTML or XML document containing a set of attributes. In the TiddlyWiki.org case, this is exactly a TiddyWiki containing a JavaScript header followed by a "storage area" containing a sequence of DIV elements. In one embodiment, each DIV element has an ID of the form 0xM.0xD where D is the hash of the body of the DIV element. In an alternative embodiment, the body is omitted from the initial transmission and retrieved using the above method for GET CONTENT using AJAX style JavaScript requests. This will greatly increase the efficiency for tiddlers containing large amounts of data.

This response can also include a CHECKPOINT identifier representing the current status of the server. Usually this would be included as the ID element for the DIV enclosing the storage area, that is, the element enclosing the set of DIV's corresponding to the attributes associated with 0xA.

Publish

The above four methods are the basic elements for exchange of data between clients and servers. Some additional methods regarding synchronization and auditing are described below in the sections that are useful for various server to server communication and tracking functions.

In addition, there is often a need to distinguish between "draft" and "public" information. In particular, a user or process might want to ensure that all of the attribute entries associated with a particular context have been registered by the server before making that information available. In other words, they might want to verify the consistency of a particular set of attributes before publishing them.

In one embodiment, accomplish this, clients use an HTTP GET method with a particular "PUBLISH" path or query component in the URL. For example, http://server.org/
publish?UID=0xA&CHECKPOINT=0xCC might direct the server to make publicly available the set of entries associated UID 0xA up to checkpoint 0xCC.

In the case of TiddlyWiki, this corresponds to publishing a static HTML file at a known location, for example:

http://server.org/0xA/index.html

In the case of success, the above URL is returned as part of a HTML page sent to the client.

Errors

In the above communications, all of the typical HTTP errors maybe returned to the client if a request tails.

However, in one embodiment, additional error conditions are used and handled. These include the "GUID Mismatch" and the "Invalid Attribute Entries" error conditions.

GUID Mismatch—If the hash of the downloaded data does not match the identifier requested, this constitutes an error condition to be handled by the client. It may indicate spoofing or simply data corruption.

Invalid Attribute Entries—The server may refuse to accept some or all of the attribute entries from a client. This may cause the client to get out of sync with the server. This can be tested by the client verifying the checkpoint returned by the server or by requesting the latest version. In any case, this condition also will be handled by the client.

Logging File Format

For each context stored on a server, the server maintains a context log. In one embodiment, this is an "append only" file format.

The log file format itself contains three types of items, ContentEntries, AttributeEntries, and Checkpoints. Using the above definitions, the format of the log file is as follows:

ContentEntry—A string entry consists of 0xA:n STRING where STRING, is the content of the entry, n is the number of characters (bytes) in STRING, and 0xA is the hash of STRING.

AttributeEntry—An attribute entry consists of 0xM.0xA: m attr1=val1 attr2=val2, where M is called the context of the attribute assignments. M is an identifier associated with a log file, usually a canonical URL for the log file including the machine name or ID. As above, 0xA is the identifier of ContentEntry A, attr1 is the label for the first attribute attribute, val1 is the value associated with that attribute for content A in context M. An arbitrary number of attribute value pairs may appear separated by spaces. m is the total number of characters in the list of attribute value pairs including the white space delimiters.

Checkpoint—A checkpoint is represented as 0xCC#0n, where 0xCC=SHA1 (0xC#0n-1, ABC), that is the hash of the previous checkpoint, 0xC#n-1, concatenated with all entries, e.g. ABC, between the previous checkpoint and the new checkpoint being calculated. On is the index of the checkpoint which is monotonically increasing for all checkpoints in the tile.

In one embodiment, a log file begins with a ContentEntry which is exactly the URL representing the context that is the canonical location where the contents of this log file can retrieved. An example first entry of the log file might be:

0xM:25 http://server.org/0xABC/0Xcc#0001 where this is the log associated with identifier 0xABC (typically this is the hash of piece of digital data that is the context or "namespace" on this machine) on the machine named server.org. 0xCC is the hash of the string "0Xm:25 http://server.org/0xABC/" checkpoint may be inserted at any time in the file. In one embodiment, a checkpoint is inserted after each POST request Note that in this case 0xM corresponds exactly to the context identifier that will be used as part of the GUID assigned to attribute entries within this file.

In one embodiment, an attribute entry looks like: 0xM.0xD:29 titled=" A Comment" modified=" Dec. 12, 2005" which indicates the title and modified date for a particular piece of content (having hash value 0xD) within this context. In one embodiment, the case of TiddlyWiki, the content is a string comment and probably appeared earlier in the file as: 0xD:17 Body of a comment Though there is no requirement that the content actually appear in the log file. Even if the content is not in the tile, the GUID can appear as part of the attribute identifier. This is especially useful if the content is large for example an image, stored elsewhere.

An example of a context log file is given below.

FIG. 1 is a flow diagram of one embodiment of a process for using logging content entries. The process of FIG. 1 is performed by processing logic that may comprise hardware (circuitry, dedicated logic, etc.) software (such as is run on a general purpose computer system or a dedicated machine), or a combination of both.

Referring to FIG. 1, the process begins by processing logic maintaining a context log with a file format that includes a sequence of content and attribute entries associated with each context punctuated by one or more checkpoints (processing block 101). In one embodiment, one content entry comprises a vector having the hash of a string and the string. In one embodiment, one attribute entry comprises a vector having entries that include an identifier associated with a log file concatenated with an identifier of a content entry and one or more pairs consisting of a label of an attribute for the content entry in a context and a value associated with the attribute. In one embodiment, the identifier of a content entry comprises a hash of the content entry and wherein the identifier associate with the log file comprises a hash of the context of attribute assignment. In one embodiments at least one checkpoint comprises a hash of the previous checkpoint concatenated with all entries between the previous checkpoint and the at

```
0x685BC516EFDE32:53 /home/wolff/.flogs/.flogs/0x9FECE9DE33864C/index.flog
0xC6565AB3047842#0000000000000001
0x685BC516EFDE32.0x90FEC5118EB17D:42 /home/wolff/.flogs/Wikis/0x9FECE9DE33864C/
0x86D9F3A45D9C5A#0000000000000002
0xCEF8FFFCB4B323:22 Doc Example TiddlyWiki
0x685BC516EFDE32.0xCEF8FFFCB4B323:76 tiddler="SiteTitle" modifier="UnaWikiServer"
modified="200604200711" tags=""
0x26C59AFFB6C251#0000000000000003
0x685BC516EFDE32.0xDA39A3EE5E6B4B:79 tiddler="SiteSubtitle" modifier="UnaWikiServer"
modified="200604200711" tags=""
0xD7111AA04C0638#0000000000000004
0x9FECE9DE33864C:18 Example TiddlyWiki
0x685BC516EFDE320.0x9FECE9DE33864C:74 tiddler="SiteUrl" modifier="UnaWikiServer"
modified="200604200711" tags=""
0x49800D642F1137#0000000000000005
0x685BC516EFDE32.0x9FECE9DE33864C:76 tiddler="_site_uid" modifier="UnaWikiServer"
modified="200604200711" tags=""
0x23DCE40FA4A013#0000000000000006
0x4B1681912B79A1:16 0x6DD8E6A255BDB7
0x685BC516EFDE32.0x4B1681912B79A1:79 tiddler="_upload_keys" modifier="UnaWikiServer"
modified="200604200711" tags=""
0x384F210F2A76EE#0000000000000007
0xDA6CEE8234591F:14 localhost:8080
0x685BC516EFDE32.0xDA6CEE8234591F:75 tiddler="SiteHost" modifier="UnaWikiServer"
modified="200604200711" tags=""
0x7133438BBCD34D#0000000000000008
0x757732CC8C3634:5 /post
0x685BC516EFDE32.0x757732CC8C3634:75 tiddler="SitePost" modifier="UnaWikiServer"
modified="200604200711" tags=""
0x19283DC1770C05#0000000000000009
0xC85AC6AED999BF:20 uid=0x9FECE9DE33864C
0x685BC516EFDE32.0xC85AC6AED999BF:77 tiddler="SiteParams" modifier="UnaWikiServer"
modified="200604200711" tags=""
0x758AE8F09101C4#000000000000000A
0x78ABC8C7E6ED28:192 Click [[PUBLISH|/publish&uid=0x9FECE9DE33864C]] to publish a
static copy of this document.
  The static, published copy can be accessed here:
http://localhost:8080/0x9FECE9DE33864C/index.html
0x685BC516EFDE32.0x78ABC8C7E6ED28:74 tiddler="Publish" modifier="UnaWikiServer"
modified="200604200711" tags=""
0xDB472842E04267#000000000000000B
0xBD1DDCC430D7A4:30 This is the body of a comment.
0x6DD8E6A255BDB7.0xBD1DDCC430D7A4:96 tiddler="A Comment" modifier="GW2"
modified="200604200712" created="200604200712" tags="example"
0xF7F73D4841E7D5#000000000000000C
``` least one checkpoint. In one embodiment, the context is a combination of first and second identifiers, wherein the first identifier identifies a machine and the second identifier identifies a group of digital data.

Thereafter, processing logic accesses the context log to review information stored therein processing block 102).

Properties

As described above, in one embodiment, a log file consists of a sequence of content and attribute entries punctuated by checkpoints. In one embodiment, this file is "append only." In other words, all entries are added on to the end of the file, and once an entry has been made it cannot be changed.

Figure 2:
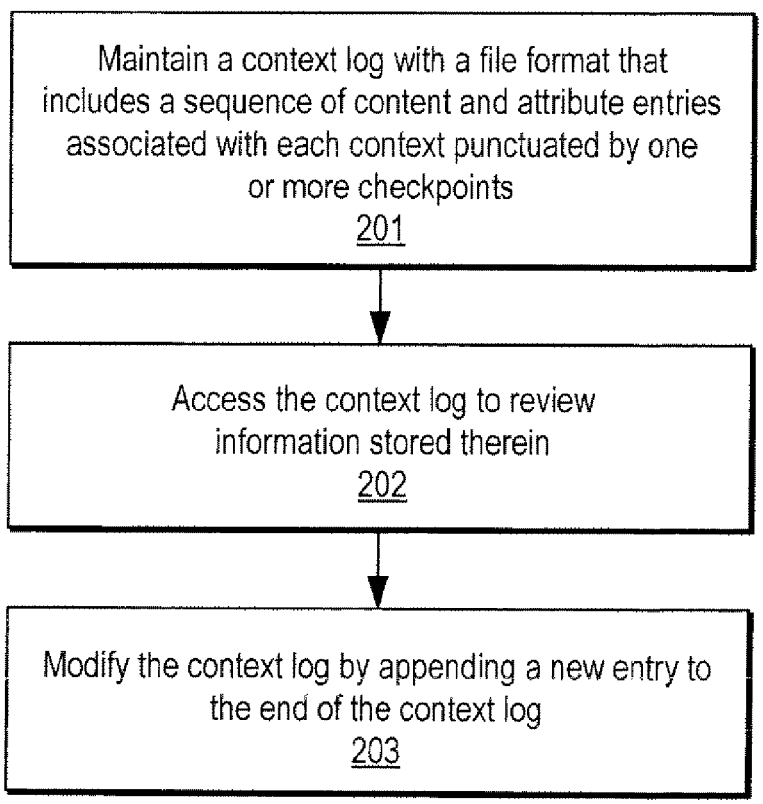
FIG. 2 is a flow diagram of one embodiment of a process for modifying a context log.

FIG. 2 is a flow diagram of one embodiment of a process for modifying a context log. The process is performed by processing logic that may comprise hardware (circuitry, dedicated logic, etc.), software (such as is run on a general purpose computer system or a dedicated machine), or a combination of both.

Referring to FIG. 2, the process begins by processing logic maintaining a context log with a file format that includes a sequence of content and attribute entries associated with each context punctuated by one or more checkpoints (processing block 201). Then, processing logic accesses the context log to review information stored therein (processing block 202). Processing logic modifies the context log by appending a new entry to the end of the context log (processing block 203).

The file is self-verifying, in the sense that a reader of the file can calculate for themselves all of the checkpoints, and ensure the integrity of the log. Even if part of a file gets corrupted, the remainder of the file may still be valid—although the history will be able to be traced back only to the first checkpoint after the corruption.

The file is extremely easy to parse. All valid entries start with 0x followed by a bounded number of non-space characters. This is called the label or entry identified. In one embodiment, checkpoints are fixed size, while the length of entries is contained within the entry identifier. A newline character separates entries and checkpoints. This means that the parser can skip over the actual content of the entries. It also means that the size of the file can be predicted if the size and number of the entries and checkpoints is known.

In one embodiment, in order to avoid threading issues, a process that is writing to a context log file locks the file when appending to the file. Note that this lock is maintained only for as long as is necessary to write a particular entry including the checkpoint. Before writing to the file, the process locates to the end of the file and verifies that the last N bytes constitute a valid checkpoint. (Since the size of checkpoints is constant and by convention that the file always ends with a checkpoint, this is a straightforward operation.) This checkpoint should be used in computing the next checkpoint to be appended at the end of appending the log entry or entries to be written.

Extensions

By convention, the current log file for a context is named "index.log" and stored in a directory named 0xABC, where 0xABC is the GUID component of the context identifier. In other words, if this fog file is the log of events or processing of a digital file, 0xABC is the hash of that file. Since a log file can grow arbitrarily large, it is useful to split up the context log into separate files. To do so, the hash of the current log file, e.g. index.log, is calculated and then the index.log file is renamed with that value, for example 0xFFF.log where 0xFFF is the hash value of the file. At this point, the file 0xFFF.log is considered "immutable" as any changes would result in the hash value of the data in the file and filename being different.

A new index.log file is then created and the first line of that file is a copy of the last checkpoint written in the previous file (that is the last checkpoint in 0xFFF.log). Then an attribute entry is written into the newly created index.log, thereby indicating that 0xFFF is the previous version of this log. For example, the attribute entry may be as follows:

0xM.0xFFF:22_type=previous_log
file_location=0xFFF.log

In this case, _type is being used for private information is in this context, namely, identifying the content with hash 0xFFF as consisting of the previous log entries within this context. Also, file-location is provided as a hint to locate the file on the local machine. Additional information, such as the number of checkpoints and the last checkpoint in that log file can also be provided as attributes.

In this way, an entire chain of files can be created that together form one large, "virtual" context log. Since all of the files except for the current index.log file are immutable, they themselves can be treated as any other content. For example, they might be stored and/or cached on other servers.

Mater Context File

In one embodiment, a master context file is used to record important changes on a server. For example each time a new content entry is uploaded to the server and/or a new content log is created, the master content file is modified to record that fact. In this way, the master content file operates as a master log.

In one embodiment, in this master log, a new attribute entry is added whenever a new content log is created. An example of a new attribute entry is as follows:

0xMASTER:0xM:22 created="2005/12/22" data=0xA
where 0xMASTER is the master context for a server, and 0xM is a particular context on the server. In this case the data=0xA attribute would indicate that this context is associated with the digital data having hash value 0xA. Optionally, the created attribute may indicate when the context log file was first created.

In one embodiment, the identifier for master context for a server is the hash of http://server.org/index.log.

All context files, and the master context tile in particular, may contain attribute entries associated with "secret data." This might include actuate entries that are "digital signatures" using the private key for the server, or simply the hash of data, which is known only to the server. This secret data and the associated entries in the context file can be used to verify the authenticity of a particular log file. For example, the first entry in a log file might be:

0xM.0xS:12_type=seed where 0xS is the hash of a secret "seed" known only to the server. Any number of such seeds could be used to initialize the log. This initial log could then be widely propagated. If a server was then challenged to prove that it created a particular log, it could then provide the secret data and associate it with the seed(s). Similarly, additional entries later in the log could be attribute entries that are "signed checkpoints" where the most recent checkpoint in the file is concatenated with one of the secret seeds and then an attribute entry is entered in the log, such as, for example:

0xM.0xS22:19_type=signed_checkpoint seed=0xS where 0xS22 is the hash of the concatenation of the previous checkpoint and the seed identified by 0xS.

Synchronization

Content Entries

In one embodiment, servers maintain a listing of content entries stored locally on their disks. This might take the form of a simple directory listing where each file is stored according to its identifier, or a database of identifiers with pointers to the actual storage locations.

When asked for a particular content (through, for example, a GET CONTENT operation), the server checks this list and, if the identifier in the request is found in the list, the associated data in the file is returned in response.

In order to mirror or backup the files on a remote machine a server can get a list of the content identifiers on that machine. This can be done by, for example, obtaining the master context log from that remote machine. Given a list of content identifiers, a server can quickly eliminate from the list any identifiers that it already has locally stored. Then, the server can request the new identifiers from that remote machine, using the GET CONTENT method, for example.

Figure 3A:
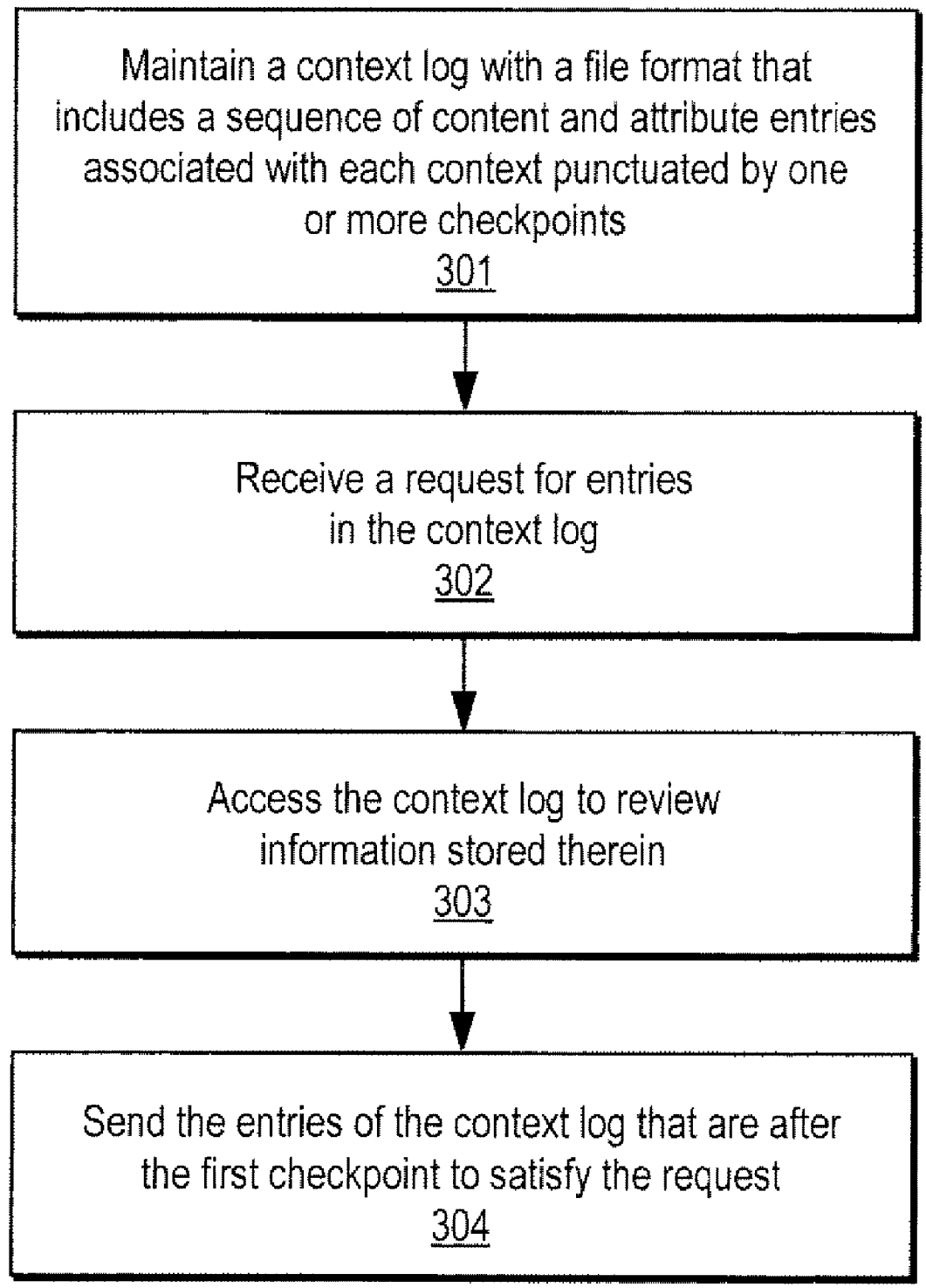
FIG. 3A is a flow diagram of one embodiment of a process for context log synchronization.

FIG. 3A is a flow diagram of one embodiment of a process for context log synchronization. The process is performed by processing logic that may comprise hardware (circuitry, dedicated logic, etc.), software (such as is run on a general purpose computer system or a dedicated machine), or a combination of both. In one embodiment, this process is performed by a server operating in conjunction with a client that desires to have its context log synchronized with one on the server.

Referring to FIG. 3A, the process begins by processing logic maintaining a context log with a file format that includes a sequence of content and attribute entries associated with each context punctuated by one or more checkpoints (processing block 301). Then, processing logic receives a request for entries in the context log (processing block 302), accesses the context log to review information stored therein (processing block 303), and sends the entries of the context log that are after the first checkpoint to satisfy the request (processing block 304).

Figure 3B:
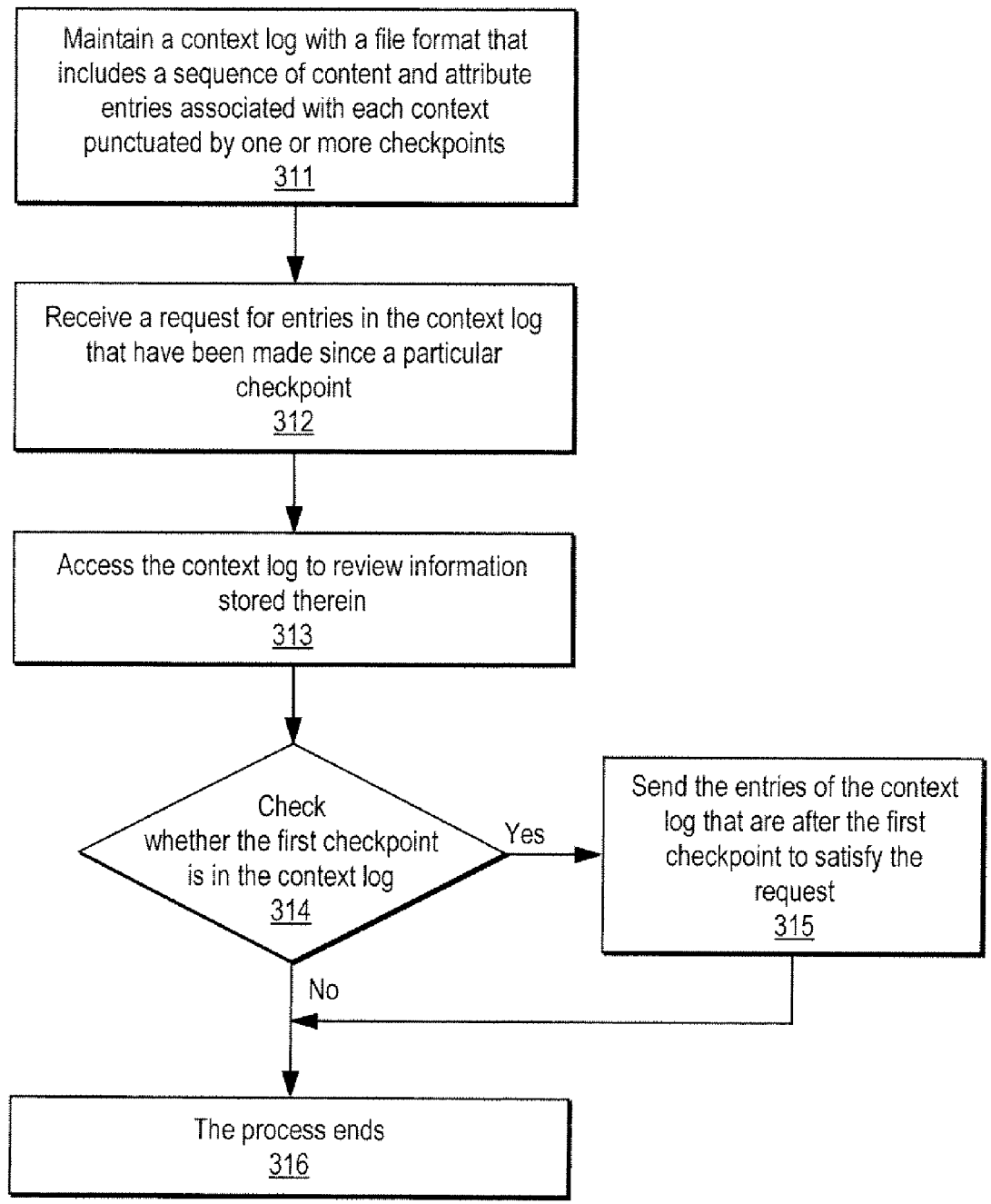
FIG. 3B is a flow diagram of another embodiment of a process for context log synchronization.

FIG. 3B is a flow diagram of another embodiment of a process for context log synchronization. The process is performed by processing logic that may comprise hardware (circuitry, dedicated logic, etc.), software (such as is run on a general purpose computer system or a dedicated machine), or a combination of both. In one embodiment, this process is performed by a server operating in conjunction with a client that desires to have its context log synchronized with one on the server.

Referring to FIG. 3B, the process begins by processing logic maintaining a context log with a file format that includes a sequence of content and attribute entries associated with each context punctuated by one or more checkpoints (processing block 311). Then, processing logic receives a request for entries in the context log that have been made since a particular checkpoint (processing block 312) and accesses the context log to review information stored therein (processing block 313). Processing logic then checks whether the first checkpoint is in the context log (processing block 314). If it is, processing logic sends the entries of the context log that are after the first checkpoint to satisfy the request (processing block 315). If not, the process ends (processing block 316).

Figure 4:
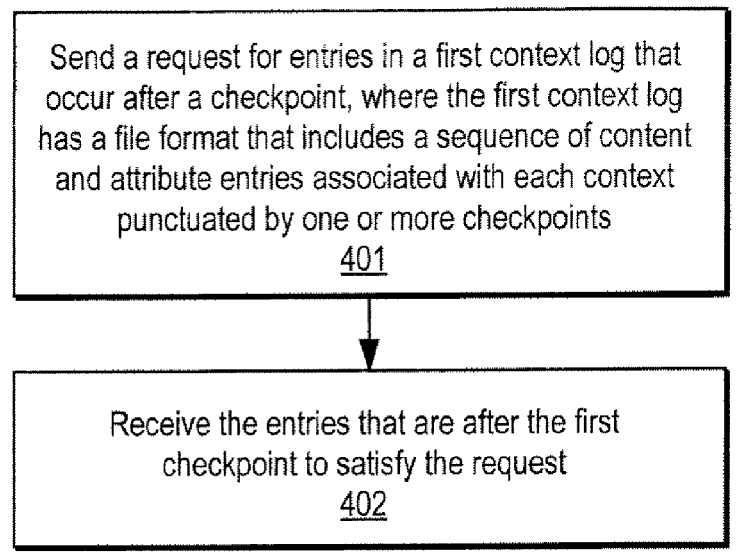
FIG. 4 is a flow diagram of another embodiment of a process for synchronizing entries in a context log.

FIG. 4 is a flow diagram of another embodiment of a process for synchronizing entries in a context log. The process is performed by processing logic that may comprise hardware (circuitry, dedicated logic, etc.), software (such as is run on a general purpose computer system or a dedicated machine), or a combination of both. In one embodiment, this process is performed by a client operating in conjunction with a server maintaining a context log.

Referring to FIG. 4, the process begins by processing logic sending a request for entries in a first context log that occur after a checkpoint, where the first context log has a tile format that includes a sequence of content and attribute entries associated with each context punctuated by one or more checkpoints (processing block 401). Next, processing logic receives the entries that are after the first checkpoint to satisfy the request (processing block 402) and adds these entries to a second context log.

Context Logs

Checkpoints can be used to efficiently synchronize logs stored on separate machines. For the log associated with document X, machine #1 can keep track of the latest checkpoint from machine #2 in the log for X, e.g., 0xC2#05 that is the fifth checkpoint. When machine #1 wants to update its log with any new entries from machine #3 it simply asks for all entries since 0xC2#05. After receiving the new entries, machine #1 can add those entries to its own log. If machine #1 has exactly the same sequence of entries as machine #2, then it's log and checkpoints will be identical to machine #2 for document X. Depending on the application, this may be the most common case.

On the other hand, if the log on machine #1 differs from that on #2, then machine #1 has to keep track of which checkpoint in it s own log corresponds to the latest checkpoint on machine #2. In this case, machine #2 could ask for all entries since 0xC2#05 (e.g. a checkpoint which may not appear in machine #1's list). If machine #1 has been keeping track of the correspondence, then it can respond with all new entries since the corresponding checkpoint in its own log. Note that machine #2 may already have some of these entries in it's log and may choose not to add them again. Also, either machine might store the labels of entries in a hash table or database and check this table before adding items into the log.

Note that if machine #1 does not have an existing checkpoint for the log on machine #2, it might send '0' to indicate that it wishes to receive all entries.

An Example of a Synchronization Procedure

In one embodiment, if a client wants to have a local copy of the latest context log and associated content stored on a particular server, the client asks for the current index.log file associated with a particular context using a request. For example, a request with the following, http://server.org/0xA/index.log returns the log associated with 0xA (e.g. the hash of a document) on server.org. The client then checks each attribute entry in the downloaded file. For each, entry after the entry that refers to the data that is not locally stored on the client, the client makes a GET CONTENT request.

For efficiency, the client keeps track of the last checkpoint in the most recently downloaded version of the index.log. When a new version is downloaded, the checkpoints are compared and only items occurring after the previous checkpoint are examined and downloaded.

Canonical Version

In one embodiment in order for two separate machines to synchronize their actions around a particular context, the two mechanisms agree to use the sequence of log entries from a third, "canonical" server. Afterwards, the entries created by each of the individual servers would be posted directly or indirectly to the canonical server. The sequence of those entries after the entries appearing in the context log from the canonical server determine the agreed-upon ordering of those entries. Such information can be used for example, to determine the "official" history of a document that was undergoing simultaneous changes on two separate servers.

Multiple Versions

In one embodiment, the log file on a single server contains entries from multiple servers. In particular, this means that the log file contains a mixture of context identifiers, such as, for example,

```
0xM1.0xD: title=" Machine M1 title"
0xM.0xCM1: _type="M1 Checkpoint entry"
0xM2.0xD: title=" Machine M2 title"
0xM.0xCM2: _type="M1 Checkpoint entry"
...
``` where M1 and M2 refer to the same "namespace" (e.g., 0xA) on different machines. In this case, the current server has no accurate entry for 0xD, or it might have decided to use either the entry after the entry from 0xCM1 and 0xCM2 associated with those attributes on servers M1 and M2 respectively. This can be used for verification and auditing purposes.

0xM.0xD: title="Machine M1 title"

A client retrieving the attributes from a particular server, e.g., getting a TiddlyWiki from server.org, might only be interested in the attributes associated with that context, e.g. only 0xM.0xD. On the other hand, the client might only be interested in the attributes associated with a different context, for example, the 0xM2 attributes from the server associated with 0xM2, even though the log is being retrieved from the server associated with 0xM.

Properties and Verification

Given two context logs from two separate machines, it is very straightforward to verify whether or not these logs have overlapping entries and whether those entries occur in the same order for each log.

Figure 5:
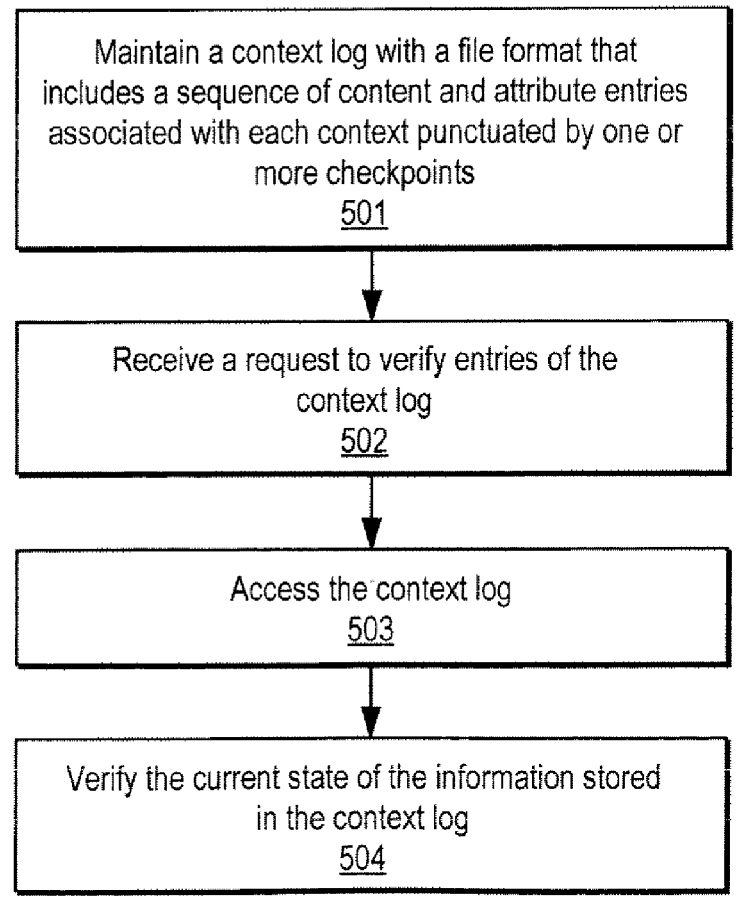
FIG. 5 is a flow diagram of one embodiment of a process for verifying a document.

FIG. 5 is a flow diagram of one embodiment of a process for verifying a document. The process is performed by processing logic that may comprise hardware (circuitry, dedicated logic, etc.), software (such as is run on a general purpose computer system or a dedicated machine), or a combination of both.

Referring to FIG. 5, the process begins by processing logic maintaining a context log with a file format that includes a sequence of content and attribute entries associated with each context punctuated by one or more checkpoints (processing block 501). Then, processing logic receives a request to verify entries of the context log (processing block 502). Processing logic accesses the context log (processing block 503) and verifies the current state of the information stored in the context log (processing block 504). In one embodiment, verifying current state of the information stored in the context log comprises verifying a current state of a document based on entries in the context log.

Figure 6:
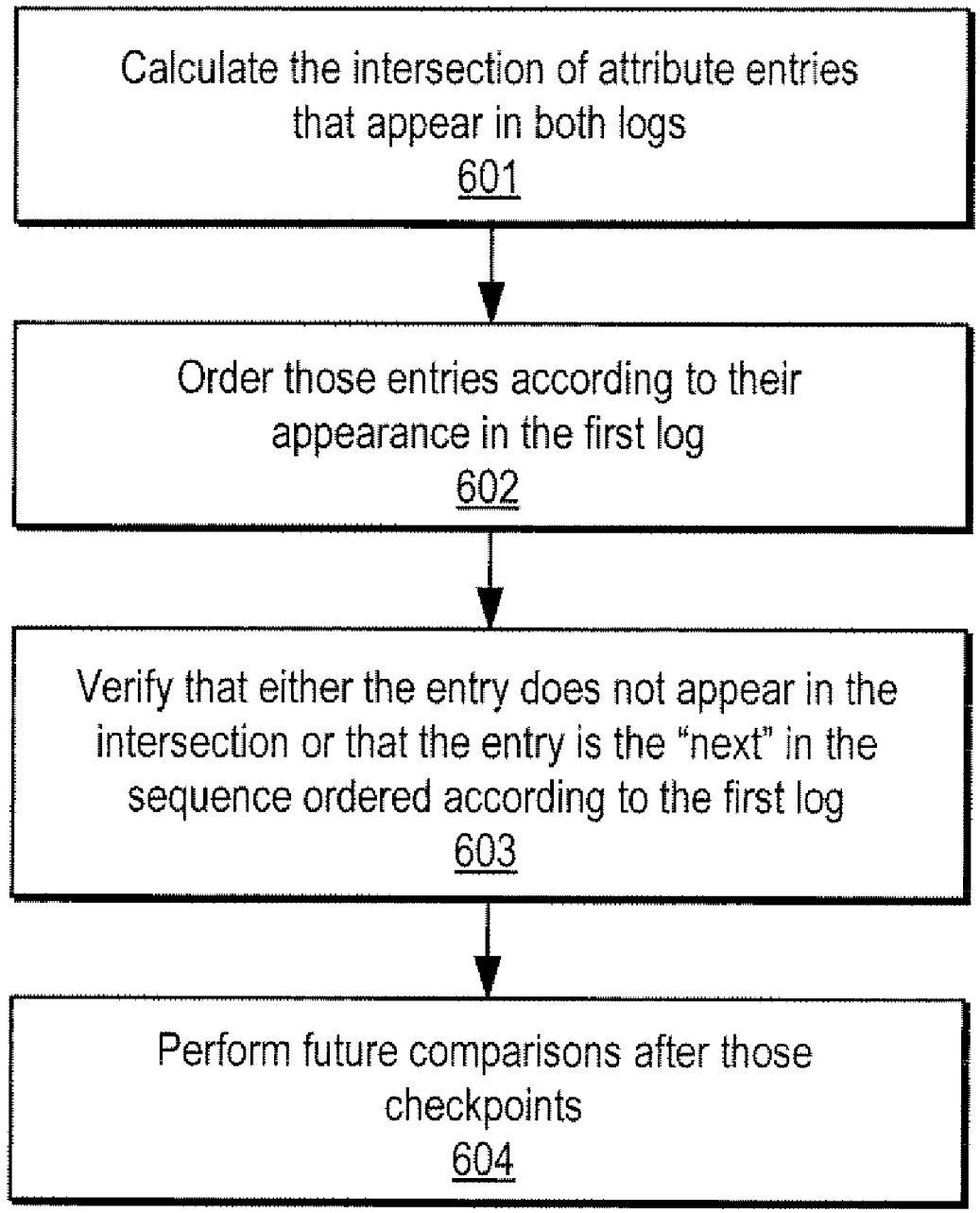
FIG. 6 is a flow diagram of one embodiment of a process for verifying whether logs having overlapping entries that are in the same order.

FIG. 6 illustrates a process for verifying whether logs having overlapping entries that are in the same order. The process is performed by processing logic that may comprise hardware (circuitry, dedicated logic, etc.), software (such as is run on a general purpose computer system or a dedicated machine), or a combination of both.

Referring to FIG. 6, the process begins by processing logic calculating the intersection of attribute entries that appear in both logs (processing block 601). Then processing logic orders those entries according to their appearance in the first log (processing block 602). Then going through the second log, for each entry, processing logic verifies that either the entry does not appear in the intersection or that the entry is the "next" in the sequence ordered according to the first log (processing block 603).

Once this procedure has been performed for entries up to checkpoint #C1 on log 1 and checkpoint #C2 on log 2, processing logic only performs future comparisons after those checkpoints (processing block X04). Note that checkpoint #C1 and checkpoint #C2 should the last checkpoint just prior to the last entry appearing in both logs.

Immutable Sequence

A s stated above, in one embodiment, any changes to log files are immediately detectable because either the checkpoints will no longer validate or previous checkpoints (e.g. stored in other logs) will no longer be found in the log.

This property can be used to create dependencies between logs. For example, if log 2 contains a reference to checkpoint 0xC1 from log 1, and log 1 contains a reference to a subsequent checkpoint 0xC2 from log 2, it becomes impossible for an attacker to modify log 1 in such a way as to maintain consistency with log 2. Even if the attacker creates new checkpoints in log 1, the entry in log 2 would remain. If the attacker includes the reference to 0xC2 in the forged log, it will be verified that 0xC2 was based on a checkpoint in log 1 that is no longer valid.

Therefore, in order to maintain consistency, the attacker would also have to modify log 2. However, this log may be on a different machine and include references or checkpoints of logs or hashes of secret data unknown to the attacker and therefore impossible for the attacker to create a valid forgery. As the number of cross-references between logs (especially logs on different machines) the possibility of forgeries that are not discoverable vanishes.

Privacy

It is important to emphasize that the context logs and associative properties do not require knowledge of the underlying content entries. For example the actual data associated with identifier 0xA might be known only to a single machine. However, attributes associated with that identifier could be set and modified on many different machines.

This property allows local, fine-grained control over access to the data separable from access to the attributes (typically termed metadata), while still maintaining auditability and accountability.

This local control allows for many different applications using the same basic system. For example in the SharedRecords system used by the ServiceLink prototype, data (e.g., a medical document such as a test result) are first encrypted before being stored. This allows for separate control of access to the data (the medical document) and comments or other metadata associated with that document. The hash of the encrypted data is used as the identifier for the associated entries, while a separate decryption key is necessary to decrypt and view the document itself. Attributes can be publicly associated with the identifier of the encrypted file particularly as comments or other entries, which may be encrypted or not, are added to a log associated with the encrypted file. Furthermore, a separate set of entries, that is, a second context, may be associated with the unencrypted version of the same file. Only someone with access to the unencrypted data, for example someone with the decryption key, could calculate the identifier and associate entries with that unencrypted file and link those entries to the entries associated with the identifier of the encrypted version. Additional sets of comments can be associated with other encrypted versions of the same document, each version using a different encryption key. Variations on this approach can be used to provide fine-grained, locally determined control over access to athletes and associated documents.

Figure 7:
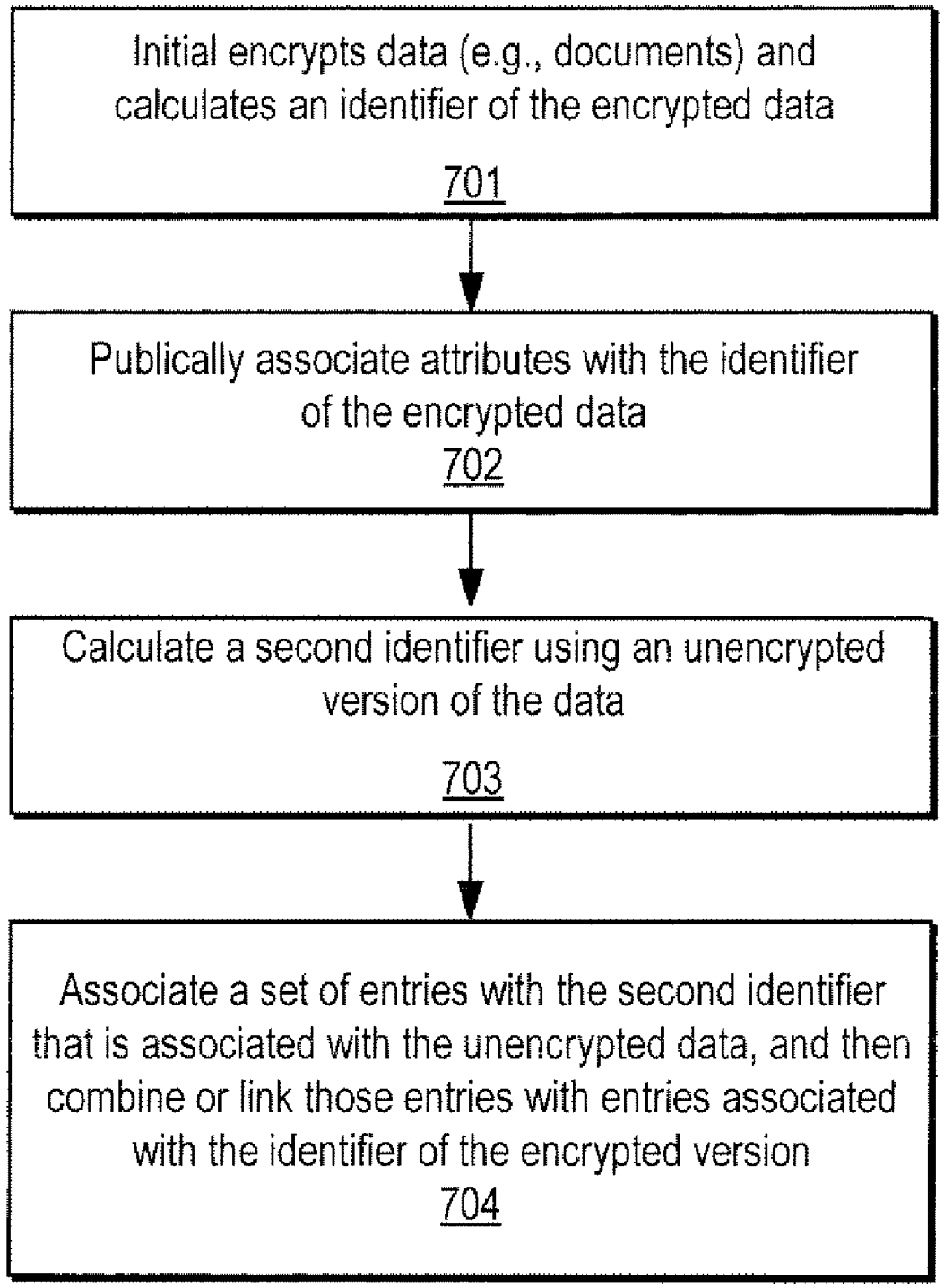
FIG. 7 is a flow diagram of one embodiment of a process for maintaining privacy of context log data.

FIG. 7 is a flow diagram of one embodiment of a process for maintaining privacy of context log data. The process of FIG. 7 is performed by processing logic that may comprise hardware (circuitry, dedicated logic, etc.), software (such as is run on a general purpose computer system or a dedicated machine), or a combination of both.

Referring to FIG. 7, processing logic initially encrypts data (e.g., document) and calculates an identifier of the encrypted data, for example the SHA1 of the encrypted data (processing block 701). Processing logic then publically associates attributes with the identifier of the encrypted data (processing block 702).

Subsequently, processing logic calculates a second identifier using an unencrypted version of the data (processing block 703). Processing logic associates a set of entries with this second identifier that is associated with the unencrypted data, and then combines or links those entries with entries associated with the identifier of the encrypted version (processing block 704).

In other cases, the content may contain transaction information. While the individual parties might want to keep information secret from each other they might reveal the information after the fact to a third-party auditor. The existence of shared versions of the context logs prevents them from forging or changing that data after the fact. In this case, the parties may choose to put only the attribute entries into the logs while they keep the content entries private. An auditor would still be able to verify that the attribute entries refer to the same content entries (use the same fingerprint for the content in the entry). Furthermore, an auditor could demand that the parties produce the associated content entries (or a specified subset of those entries) and verify that these entries correspond to the attribute entries in the log.

Authentication

In a client server system, the servers usually implement controls on who can access the server or various resources on the server. This is typically done using a login ID and password provided by the client, which is compared against a database stored on the server. The same type of mechanisms can, of course, be used for authenticating and validating users of a server in the system described herein.

As a complementary or alternate approach, authentication information can also be stored in specific attribute entries to each context or namespace independent of the machine.

For example, in the current implementations, a context log may contain an attribute entry with type (or title) "\_update\_keys", e.g.,:

0xM.0xK:22 title="\_update\_keys"

The server then uses the content associated with identifier 0xK for authentication of posts to this context. In particular, 0xK can be the hash of a list of hashes, each of which corresponds to an email address or other phrase. When the client makes a post request, they include a cookie or attribute containing the plaintext e-mail address or phrase, e.g., owner="wolff@ricoh.com". The server calculates the hash of this phrase and compares it with the list of hashes in 0xK. If it appears in the list, then the post request is accepted.

Figure 8:
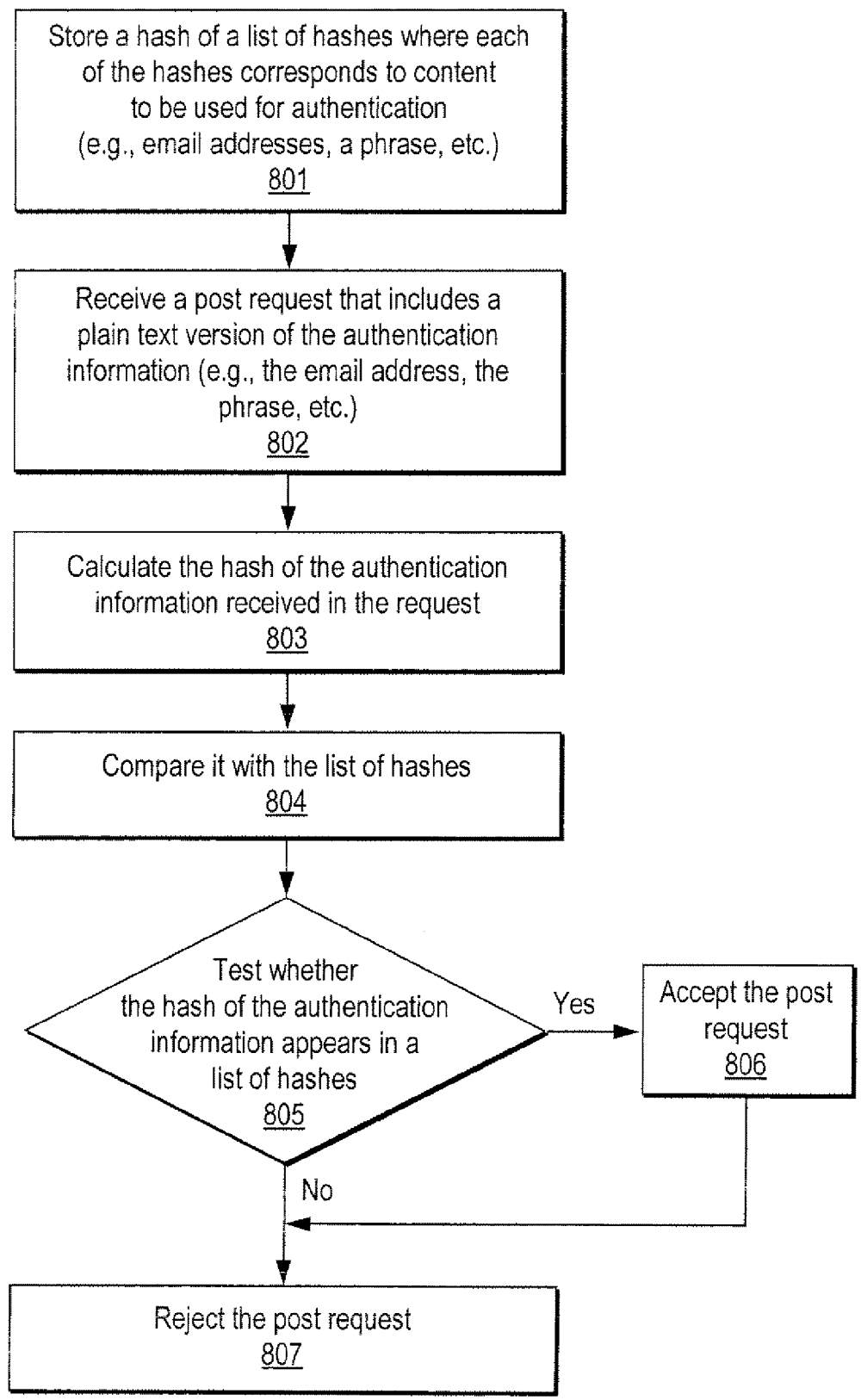
FIG. 8 is a flow diagram of one embodiment of a process for authentication.

FIG. 8 is a flow diagram of one embodiment of a process for authentication. The process of FIG. 8 is performed by processing logic that may comprise hardware (circuitry, dedicated logic, etc.), software (such as is run on a general purpose computer system or a dedicated machine), or a combination of both. In one embodiment, this process is performed by a server.

Referring to FIG. 8, the process begins by processing logic storing a hash of a list of hashes where each of the hashes corresponds to content to be used for authentication (email addresses, a phrase, etc.) (processing block 801). Next, processing logic receives a post request that includes a plain text version of the authentication information (e.g., the email address, the phrase, etc.) (processing block 802). In one embodiment, the plain text version of the authentication information may be contained in an attribute. Then, processing logic calculates the hash of the authentication information received in the request (processing block 803) and compares it with the list of hashes (processing block 804). Thereafter, processing logic tests whether the hash of the authentication information appears in a list of hashes (processing block 805). If it does, processing logic accepts the post request (processing block 806) and the process ends. If not, processing logic rejects the post request (processing block 807) and the process ends.

Note in particular that this POST request might provide a new value for the _update_keys attribute entry In this way clients can have local control over authentication within a particular context.

When a new context log is initiated by a user request, the owner parameter (or equivalent cookie) of that request can be used to seed the initial value of _update_keys.

Similar methods can be used for GET requests, PUBLISH requests, etc.

Server Policies

Note that different servers may have different policies on how this type of information is treated. In an alternative embodiment, the server might require that a new key (e.g., a hash) is provided each time. This may be either because the client provides a hash of the "next" key in addition to the parameter that is the plain text of current key or because the server provides the "next" plaintext key to the client as part of the response.

Servers might also differ in which attribute entries they accept into their local context. As noted above, the context log on one server might include attribute entries from a different context (e.g., 0xM1.0xD where 0x.M1 is associated with 0xA on a remote server) that differ from the local attribute entries associate with the same content (e.g., 0xM.0xD: foo="bar" and 0xM1.0xD: foo="notbar" can exist in the same log). The policies governing what entries servers identify as being within their own context will differ from server to server. However, the mechanisms for auditing and comparison—that is the basis for traceability—remain identical across servers.

Content Bused Authentication

Secret information can also be used for authentication between servers. For example, the identifier for a content entry, 0xA, might correspond to a "secret" phrase or data that is known only to a small group of people or machines. For example, this data might be the URL of a page on an intranet, the subject of an e-mail, or a jpg file stored on the local filesystems of the user's PCs.

Even though the identifier 0xA is public, the secret data can be used to authenticate or validate entries. For example, suppose that only people who have received a particular e-mail with the subject heading corresponding to 0xA should be allowed to add attribute entries for the context associated with 0xA.

Each of the users could "sign" attribute entries by first sending the normal attribute entry, including for example the body of a comment. Then they could send a "signature" attribute entry which is of the form:

0xM.0xDS:22 type=signature entry=0xD

In this case, 0xDS is the hash of the secret data concatenated with the content identified by 0xD. Any other user or machine that has access to both the content, i.e. the data that hashes to 0xD, and the secret (which hashes to 0xA) can verify that 0xDS is the correct hash. This provides a method for individual users to authenticate each other's entries without requiring trust in the central server(s).

Figure 9:
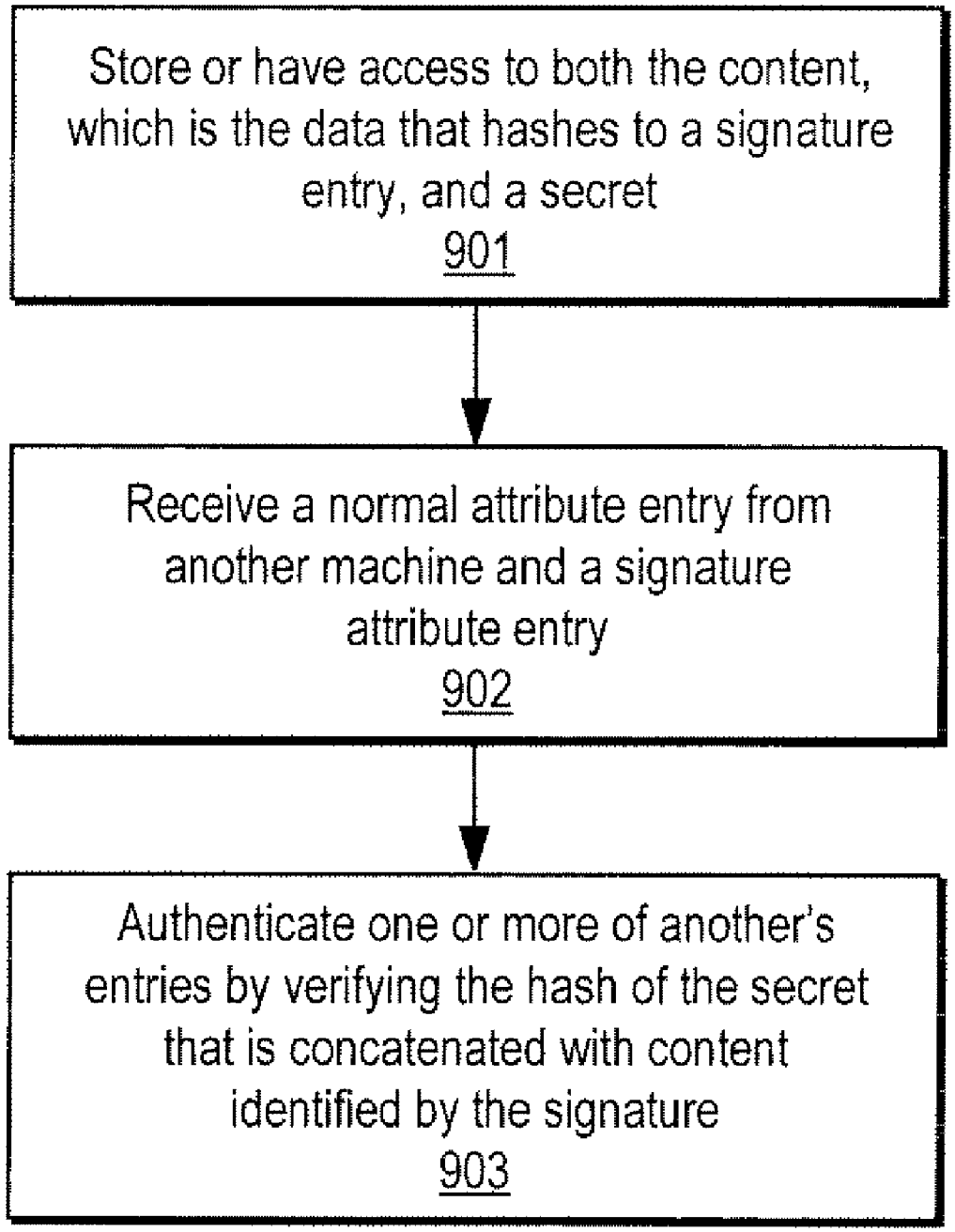
FIG. 9 is a flow diagram of one embodiment of a process for authenticating another user's entries without using a trusted central party.

FIG. 9 is a flow diagram of one embodiment of a process for authenticating another user's entries without using a trusted central party. The process is performed by processing logic that may comprise hardware (circuitry, dedicated logic, etc.), software (such as is run on a general purpose computer system or a dedicated machine), or a combination of both.

Referring to FIG. 9, process begins by processing logic storing or having access to both the content, which is the data that hashes to a signature entry and a secret (processing block 901). Subsequently, processing logic receives a normal attribute entry from another machine and a signature attribute entry (processing block 902). The signature attribute entry contains data that is the hash of the secret data concatenated with the content identified by the signature entry. Processing logic then authenticates one or more of another's entries by verifying the hash of the secret that is concatenated with content identified by the signature (processing block 903).

Versioning

One typical use of context logs is to keep track of versions. For example suppose that 0xA corresponds to the hash of
http://server.org/wolff/index.html The log associated with 0xA might include a sequence of entries that point to subsequent versions of this file. For example, one entry might be:
0xM.0xA1:22 type=contents modified=2005/12/22 to indicate, on the modified date, the content of the file index.html had the identifier 0xA1. At a later time, a new version of that file might be published on the above URL. In that case, another entry would be included in the log:
0xM.0xA2:22 type=contents modified=2005/12/22

In effect, the second entry supersedes the previous entry. In this way, a version history for the contents of the file located at the URL corresponding to 0xA can be maintained. Note that there might also be cross references in the context logs for 0xA1 and 0xA2 pointing, for example, to the previous and next versions as well as to the published location 0xA.

It's useful to note that these entries could be made in a distributed manner oil different machines at different times. For example, a user on another machine might download and modify the file 0xA2. On that machine, another entry might be made:
0xM1A2.0xA3:22 type=NewVersion modified=2005/12/23 where 0xM1A2 is the context log on machine M1 for 0xA2 and 0xA3 is a new digital file based on 0xA2. When the logs for machine M and M1 are reconciled, it then becomes possible to track the history of the original document 0xA1 through 0xA2 to 0xA3 using the attribute entries of the corresponding logs.

TiddlyWiki

The following is an example storeArea component of the TiddyWiki html file corresponding to the examples of the context log given above. Note that in cases where the context log includes multiple attribute entries with the same title, the server may respond with only the most recent version of that tiddler. Also, in cases where the log includes attribute entries from other contexts (e.g. 0xM1.0xD instead of 0xM.0xD), the server or the client may decide not to include those entries or to include them only if there are no attributes assigned in the 0xM context.

```
<div id="storeArea" checkpoint="0xF7F73D4841E7D5#000000000000000C">
<div ID="0xCEF8FFFCB4B323" tiddler="SiteTitle" modifier="UnaWikiServer" modified="200604200711" tags="">Doc Example TiddlyWiki</div>
<div ID="0xDA39A3EE5E6B4B" tiddler="SiteSubtitle" modifier="UnaWikiServer" modified="200604200711" tags=""></div>
<div ID="0x9FECE9DE33864C" tiddler="__site__uid" modifier="UnaWikiServer" modified="200604200711" tags="">Example TiddlyWiki</div>
<div ID="0x9FECE9DE33864C" tiddler="__site__uid" modifier="UnaWikiServer" modified="200604200711" tags="">Example TiddlyWiki</div>
<div ID="0xC85AC6AED999BF" tiddler="SiteParams" modifier="UnaWikiServer" modified="200604200711" tags="">uid=0x9FECE9DE33864C</div>
<div ID="0x757732CC8C3634" tiddler="SitePost" modifier="UnaWikiServer" modified="200604200711" tags="">/post</div>
<div ID="0x78ABC8C7E6ED28" tiddler="Publish" modifier="UnaWikiServer" modified="200604200711" tags="">Click
[[PUBLISH|/publish&uid=0x9FECE9DE33864C]] to publish a static copy of this document.
  The static, published copy can be accessed here:
http://localhost:8080/0x9FECE9DE33864C/index.html</div>
<div ID="0xDA6CEE8234591F" tiddler="SiteHost" modifier="UnaWikiServer" modified="200604200711" tags="">localhost:8080</div>
<div ID="0xBD1DDCC430D7A4" tiddler="A Comment" modifier="GW2" modified="200604200712" created="200604200712" tags="example">This is the body of a comment.</div>
<div ID="0x4B1681912B79A1" tiddler="__upload__keys" modifier="UnaWikiServer" modified="200604200711" tags="">0x6DD8E6A255BDB7</div>
</div>
```

An Example of a Computer System

Figure 10:
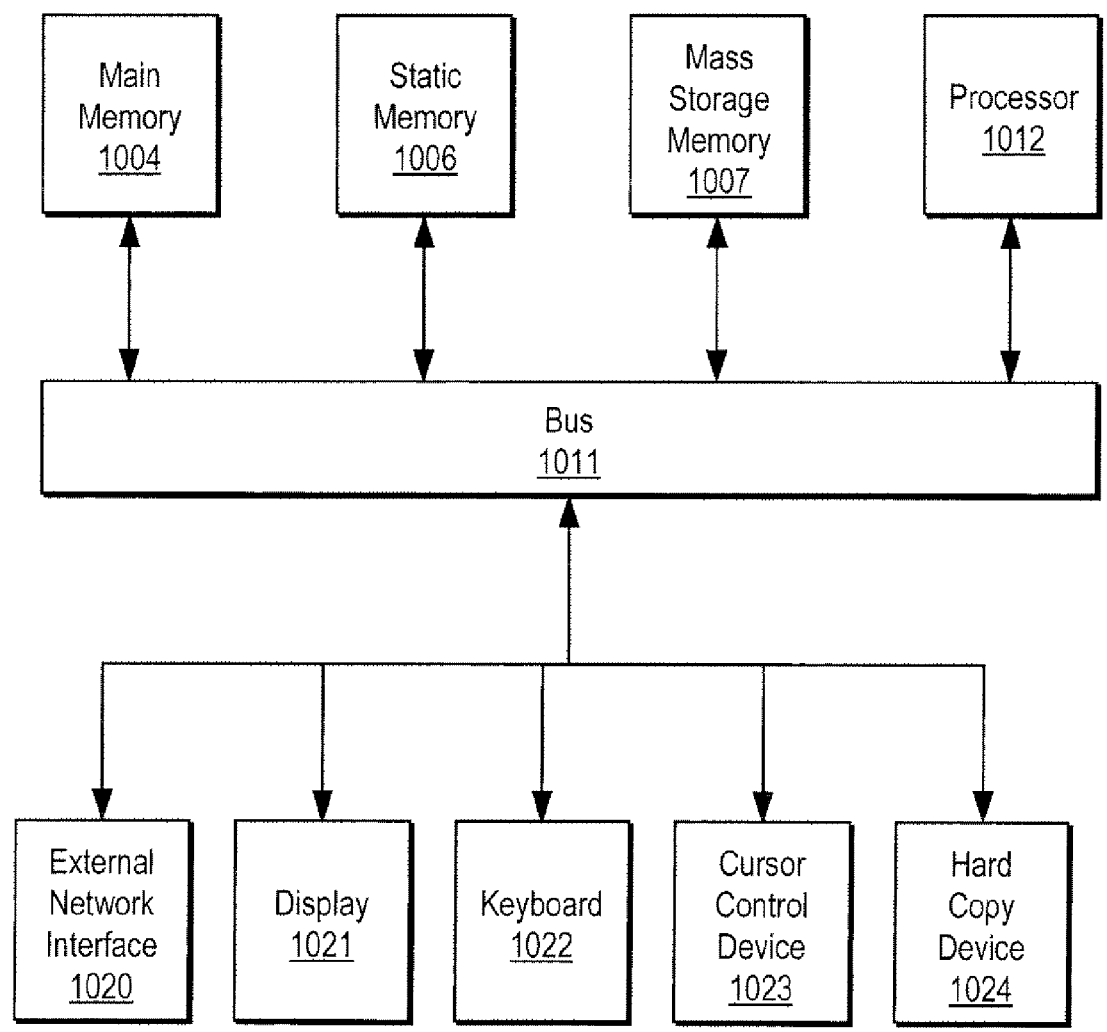
FIG. 10 is a block diagram of an exemplary computer system.

FIG. 10 is a block diagram of an exemplary computer system that may perform one or more of the operations described herein. Referring to FIG. 10, computer system 1000 may comprise an exemplary client or server computer system. Computer system 1000 comprises a communication mechanism or bus 1011 for communicating information, and a processor 1012 coupled with bus 1011 for processing information. Processor 1012 includes a microprocessor, but is not limited to a microprocessor, such as, for example, Pentium™, PowerPC™. Alpha™, etc.

System 1000 further comprises a random access memory (RAM), or other dynamic storage device 1004 (referred to as main memory) coupled to bus 1011 for storing information and instructions to be executed by processor 1012. Main memory 1004 also may be used for storing temporary variables or other intermediate information during execution of instructions by processor 1012.

Computer system 1000 also comprises a read only memory (ROM) and/or other static storage device 1006 coupled to bus 1011 for storing static information and instructions for processor 1012, and a data storage device 1007, such as a magnetic disk or optical disk and its corresponding disk drive. Data storage device 1007 is coupled to bus 1011 for storing information and instructions.

Computer system 1000 may further be coupled to a display device 1021 such as a cathode ray tube (CRT) or liquid crystal display (LCD), coupled to bus 1011 for displaying information to a computer user. An alphanumeric input device 1022, including alphanumeric and other keys, may also be coupled to bus 1011 for communicating information and command selections to processor 1012. An additional user input device is cursor control 1023, such as a mouse, trackball, trackpad, stylus, or cursor direction keys, coupled to bus 1011 for communicating direction information and command selections to processor 1012, and for controlling cursor movement on display 1021.

Another device that may be coupled to bus 1011 is hard copy device 1024, which may be used for marking information on a medium such as paper, film, or similar types of media. Another device that may be coupled to bus 1011 is a wired/wireless communication capability 1025 to communication to a phone or handheld palm device.

Note that any or all of the components of system 800 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A method comprising:
   maintaining a first log with a file format that includes a sequence of content and attribute entries associated with each context punctuated by one or more checkpoints, wherein one content entry comprises a vector having the hash of a string and the string, and wherein one attribute entry comprises a vector having entries that include an identifier associated with a log file concatenated with an identifier of a content entry and one or more pairs consisting of a label of an attribute for the content entry in a context and a value associated with the attribute;
   receiving, at a computer system, a request from a requestor to post data to the first log;
   identifying the log based on a context identifier in the request indicative of a location of the first log and digital data associated with a document corresponding to the first log;
   creating a first entry based on the data in the request, wherein the first entry includes at least a hash of the data to be posted, a string that represents the data, and a number of characters in the string;
   appending the first log with the first entry;
   calculating a first identifier based on log entries in the first log;
   sending the first identifier to the requester; and
   accessing the context log to review information stored therein.

2. The method defined in claim 1 wherein the first identifier comprises a checkpoint of the log entries.

3. The method defined in claim 1 further comprising sending a response with one or more items that have been posted in the first log.

4. The method defined in claim 3 wherein one or more items in the first log are in a sequence based on the time at which each of the one or more items were posted in the first log.

5. The method defined in claim 3 further comprising synchronizing a second log with the one or more items.

6. The method defined in claim 1 wherein the request is an HTTP POST.

7. The method defined in claim 1 wherein the identifier of a content entry comprises a hash of the content entry and wherein the identifier associated with the first log comprises a hash of the context of attribute assignment.

8. The method defined in claim 1 wherein at least one checkpoint comprises a hash of the previous checkpoint concatenated with all entries between the previous checkpoint and the at least one checkpoint.

9. The method defined in claim 8 wherein the request for entries in the first log is a request for all entries after a checkpoint specified in the request; and further comprising determining whether the checkpoint is in the first log.

10. The method defined in claim 9 wherein at least one of the entries includes a first hashed version of the data that has been propagated to other locations, wherein the data is used to verify the authenticity of the first log, and further comprising:
    a machine receiving a request to prove that the machine created the first log; and
    the machine sending the data, such that a hash may be applied to the data to create a second hashed version of the data compared to an instance of the first hashed version that had been propagated to prove the machine created the first log.

11. The method defined in claim 1 wherein the context is a combination of first and second identifiers, wherein the first identifier identifies a machine and the second identifier identifies a group of digital data.

12. The method defined in claim 1 wherein the first log is self-verifying.

13. The method defined in claim 1 further comprising verifying current state of the information stored in the first log.

14. The method defined in claim 13 wherein verifying current state of the information stored in the context log comprises verifying a current state of a document based on entries in the first log.

15. The method defined in claim 1 further comprising:
    receiving a request for entries in the first log, the request including a checkpoint; and
    sending the entries that are after the checkpoint to satisfy the request.

16. The method defined in claim 1 further comprising:
    calculating a hash of a portion of data received in the request;
    comparing the hash to a list of one or more hashes in an identifier associated with the first log; and
    accepting the post request if the hash appears in the list of hashes in the identifier.

17. A method comprising:
receiving, at a computer system, a request from a requestor to post data to a first log;
identifying the log based on a context identifier in the request indicative of a location of the first log and digital data associated with a document corresponding to the first log;
creating a first entry based on the data in the request, wherein the first entry includes at least a hash of the data to be posted, a string that represents the data, and a number of characters in the string;
appending the first log with the first entry;
calculating a first identifier based on log entries in the first log;
sending the first identifier to the requester;
sending a response with one or more items that have been posted in the first log;
synchronizing a second log with the one or more items by,
calculating an intersection of attribute entries that appear in first log and the second log that include first and second sequences, respectively, of content and attribute entries associated with each context punctuated by one or more checkpoints;
ordering entries according to their appearance in the first log;
determining whether each entry in the second log is in the intersection of attribute entries or is the next entry in the order; and
performing an additional comparison between the first and second logs starting only after checkpoints in each of the first and second logs subsequent to the first and second sets of sequences.

18. A method comprising:
maintaining a second context log with a file format that includes a sequence of content and attribute entries associated with each context punctuated by one or more checkpoints, wherein one content entry comprises a vector having the hash of a string and the string, and wherein one attribute entry comprises a vector having entries that include an identifier associated with a log file concatenated with an identifier of a content entry and one or more pairs consisting of a label of an attribute for the content entry in a context and a value associated with the attribute;
obtaining an index, at a client computer system, of a first context log that is maintained at a server computer system;
sending a request for entries in the first context log that occur after a first checkpoint extracted from the index, wherein the first checkpoint is stored within the second context log maintained at the client computer system;
receiving the entries that are after the first checkpoint to satisfy the request;
adding one or more of the entries to the second context log to synchronize the second context log and the first context log; and
accessing the second context log to review information stored therein.

19. The method defined in claim 18 wherein the first context log has a file format that includes a sequence of content and attribute entries associated with each context punctuated by one or more checkpoints.

20. The method defined in claim 18 wherein the second context log is identical to the first context log after adding the one or more entries.

21. A method comprising:
obtaining an index, at a client computer system, of a first context log that is maintained at a server computer system;
sending a request for entries in the first context log that occur after a first checkpoint extracted from the index, wherein the first checkpoint is stored within a second context log maintained at the client computer system;
receiving the entries that are after the first checkpoint to satisfy the request; and
adding one or more of the entries to the second context log to synchronize the second context log and the first context log;
calculating an intersection of attribute entries that appear in first and second logs that include first and second sequences, respectively, of content and attribute entries associated with each context punctuated by one or more checkpoints;
ordering entries according to their appearance in the first log;
determining whether each entry in the second log is in the intersection of attribute entries or is the next entry in the order; and
performing an additional comparison between the first and second logs starting only after checkpoints in each of the first and second logs subsequent to the first and second sets of sequences.

22. An article of manufacture having one or more computer readable storage media storing instructions thereon which, when executed by a system, cause the system to perform a method comprising:
obtaining an index of a first context log that is maintained at a server computer system;
sending a request for entries in the first context log that occur after a first checkpoint extracted from the index, wherein the first checkpoint is stored within a second context log maintained at the client computer system;
receiving the entries that are after the first checkpoint to satisfy the request;
adding one or more of the entries to a second context log to synchronize the second context log and the first context log;
calculating an intersection of attribute entries that appear in the first and second context logs that include first and second sequences, respectively, of content and attribute entries associated with each context punctuated by one or more checkpoints;
ordering entries according to their appearance in the first context log;
determining whether each entry in the second context log is in the intersection of attribute entries or is the next entry in the order;
storing checkpoints in each of the first and second context logs subsequent to the first and second sets of sequences; and
performing an additional comparison between the first and second logs starting only after checkpoints in each of the first and second logs subsequent to the first and second sets of sequences.

23. A method comprising:
storing a first entry in a log that includes an identifier, wherein the identifier comprise a list of hashes, where each of the hashes corresponds to content to be used for authentication;
receiving a request to post a new entry into the log, wherein the new entry includes a plain-text portion of data purported to correspond to one of the hashes of the content to authenticate an originator of the request;

calculating a hash of the portion of data received in the request;

comparing the hash of the portion of data to a list of one or more hashes in the identifier; and accepting the post request if the hash of the portion of data appears in the list of hashes in the identifier calculating an intersection of attribute entries that appear in the log and a second log that include first and second sequences, respectively, of content and attribute entries associated with each context punctuated by one or more checkpoints;

ordering entries according to their appearance in the log;

determining whether each entry in the second log is in the intersection of attribute entries or is the next entry in the order;

storing checkpoints in each of the log and the second log subsequent to the first and second sets of sequences; and performing an additional comparison between the log and the second log for one or more attribute entries added to the log and the second log after the storing starting only after the stored checkpoints.

24. The method defined in claim 23 wherein the data comprises one selected from a group consisting of a phrase, an address, and a sequence of characters.

* * * * *